(12) United States Patent
Sasagawa et al.

(10) Patent No.: US 7,671,116 B2
(45) Date of Patent: Mar. 2, 2010

(54) COMPOSITION FOR FORMING INK-RECEIVER LAYER, METHOD OF PRODUCING THE SAME, AND PRINTING BASE

(75) Inventors: Nobuyuki Sasagawa, Tachikawa (JP); Yoshiharu Kimura, Fuchu (JP); Masaaki Kunou, Hachioji (JP); Mineo Hasegawa, Hachioji (JP); Hideki Yamaguchi, Kyoto (JP); Ayako Maruta, Kyoto (JP)

(73) Assignee: Q.P. Corporation, Shibuya-ku, Tokyo (JP)

( * ) Notice: Subject to any disclaimer, the term of this patent is extended or adjusted under 35 U.S.C. 154(b) by 184 days.

(21) Appl. No.: 11/573,606

(22) PCT Filed: Aug. 15, 2005

(86) PCT No.: PCT/JP2005/014920

§ 371 (c)(1),
(2), (4) Date: Aug. 10, 2007

(87) PCT Pub. No.: WO2006/019079

PCT Pub. Date: Feb. 23, 2006

(65) Prior Publication Data

US 2008/0003375 A1    Jan. 3, 2008

(30) Foreign Application Priority Data

Aug. 19, 2004    (JP) .............................. 2004-239733

(51) Int. Cl.
C09D 4/02    (2006.01)
C09D 189/00    (2006.01)

(52) U.S. Cl. .............................. 524/21; 523/220; 525/8

(58) Field of Classification Search ................... 524/21; 525/8; 523/220
See application file for complete search history.

(56) References Cited

U.S. PATENT DOCUMENTS

| 3,889,270 | A | | 6/1975 | Hoffmann et al. |
| 6,437,017 | B1 | * | 8/2002 | Komaki ....................... 522/182 |
| 6,498,204 | B1 | * | 12/2002 | Ubara ......................... 524/12 |
| 6,852,407 | B2 | * | 2/2005 | Yasue ......................... 428/336 |

FOREIGN PATENT DOCUMENTS

| JP | 60023456 | A | * | 2/1985 |
| JP | 61 172787 | A | | 8/1986 |
| JP | 03039033 | A | * | 2/1991 |
| JP | 05331343 | A | * | 12/1993 |
| JP | 06-060432 | | | 3/1994 |
| JP | 06080913 | A | * | 3/1994 |

(Continued)

OTHER PUBLICATIONS

JP 06080913 A, Okubo et al., English Abstract, Mar. 1994.*

(Continued)

*Primary Examiner*—Satya B Sastri
(74) *Attorney, Agent, or Firm*—Daniel J. Schlue; Roetzel & Andress (57) ABSTRACT

The composition for forming an ink-receiver layer according to the invention comprises (A) a monomer component containing a monofunctional monomer; (B) a powder containing an egg white component; and (C) eggshell powder. The component (A) may further contain a polyfunctional monomer with two or more functions.

20 Claims, 1 Drawing Sheet

FOREIGN PATENT DOCUMENTS

| | | |
|---|---|---|
| JP | 07-169100 | 7/1995 |
| JP | 07-272441 | 10/1995 |
| JP | 10-025672 A | 1/1998 |
| JP | 10-259340 | 9/1998 |
| JP | 11-213445 | 8/1999 |
| JP | 2000219820 A * | 8/2000 |
| JP | 2001-311022 | 11/2001 |
| JP | 2004-074613 A | 3/2004 |
| JP | 2006-056111 | 2/2006 |
| JP | 2006-056112 | 2/2006 |
| JP | 2006-096998 | 4/2006 |
| WO | WO 0174931 A1 * | 10/2001 |

OTHER PUBLICATIONS

JP 03039033 A, Yasumoto et al., English Abstract, Feb. 1991.*
JP 2000219820 A, Hyodo, Aug. 2000, Machine Translation.*
JP 05331343 A, Yamada et al., Dec. 1993, English Translation.*
JP 60023456 A, Inoue et al., Feb. 1985, English Translation.*

* cited by examiner

FIG.1

COMPOSITION FOR FORMING INK-RECEIVER LAYER, METHOD OF PRODUCING THE SAME, AND PRINTING BASE

This application claims priority to PCT/JP2005/014920 filed Aug. 15, 2005, and Japanese Application No. JP2004-239733 filed Aug. 19, 2004, both of which are incorporated herein by reference in their entireties.

TECHNICAL FIELD

The present invention relates to a composition for forming an ink-receiver layer capable of printing characters or image information by an inkjet method. The invention also relates to a printing base having an ink-receiver layer formed using the composition for forming an ink-receiver layer.

BACKGROUND ART

In recent years, a CD or DVD-type optical recording medium capable of writing or reading information using a laser has been widely used. Traders handling a variety of optical recording media in small amounts are required to be able to print characters or images showing the content recorded by an optical recording medium using an inkjet method. As an increasing number of end users started to use an optical recording medium, printers capable of printing information onto such a recording medium have been introduced into the market. In order to optimize the design of the label side of a disk (side opposite to the side on which optical writing/reading is performed), there is an increasing demand for printing not only characters representing the recorded content but also high-quality images like photographs.

With such a background, a number of optical recording media which have a label side capable of being printed with an inkjet printer have also onto the market. Since ink used in the inkjet method is normally aqueous, a water-absorptive ink-receiver layer is formed on the surface of the label side. As the coating composition for forming an ink-receiver layer, a composition which cures upon exposure to radiation such as UV rays is widely used from the viewpoint of productivity.

The ink-receiver layer is required to have properties of quickly drying ink used in the inkjet method, capability of displaying clear images, and properties of preserving printed images such as water resistance. As the coating composition satisfying these requirements, a coating composition which improves resolution while promoting ink absorption by providing irregularities on the surface of a hydrophilic ink-receiver layer is described in JP-A-06-60432.

A coating composition capable of improving quick-drying properties and image clarity obtained by adding an inorganic filler or an organic filler to a hydrophilic resin has been proposed. As an example of the inorganic filler, a coating composition containing a porous smecktite is described in JP-A-07-272441.

A coating composition containing porous alumina as an inorganic filler is described in JP-A-11-213445. A coating composition containing water-absorptive resin particles as an organic filler is described in JP-A-07-169100. A coating composition containing a naturally occurring material as an organic filler is also described in JP-A-10-259340.

In order to improve water resistance of an ink-receiver layer, a number of coating compositions containing organic cations has also been proposed. Normally, an acidic dye is used as ink for the inkjet method. These coating compositions have been proposed to cause dye particles having an opposite charge to fix an ink-receiver layer by adding organic cations to the ink-receiver layer. JP-A-2001-311022 describes specific examples of such a coating composition.

DISCLOSURE OF THE INVENTION

However, in some ink-receiver layers to which the inorganic or organic fillers are added, it is difficult to have all of the quick-drying properties, image clarity, and image preservativeness such as water resistance at the same time. When mixing a porous inorganic filler with a resin, not only may quick-drying properties deteriorate as the resin penetrates pores of the filler to lower water absorption, but also blotting may occur due to capillary phenomenon. When a highly water-absorptive organic filler is used, though ink absorbency may improve, drying properties and water resistance may deteriorate. Therefore, an ink-receiver layer with further improved quick-drying properties, image clarity, and water resistance is desired.

An object of the invention is to provide a composition for forming an ink-receiver layer excelling in quick-drying properties, image clarity, and water resistance, and a method of producing the same.

Another object of the invention is to provide a printing base having an ink-receiver layer obtained by using the above composition.

The composition for forming an ink-receiver layer according to the invention comprises: (A) a monomer component containing a monofunctional monomer, (B) powder containing an egg white component; and (C) eggshell powder.

In the composition for forming an ink-receiver layer according to the invention, the egg white component may contain a polyvalent metal salt.

In the composition for forming an ink-receiver layer according to the invention, the component (A) may further contain a bifunctional or a greater functional monomer.

In the composition for forming an ink-receiver layer according to the invention, the component (B) may be dried egg white particles.

In the composition for forming an ink-receiver layer according to the invention, the component (B) may be inorganic or organic particles of which the surfaces are covered with the egg white component.

In the composition for forming an ink-receiver layer according to the invention, the component (B) may have an average particle diameter of 0.01 to 30 microns.

In the composition for forming an ink-receiver layer according to the invention, the component (C) may have an average particle diameter of 0.01 to 30 microns.

In the composition for forming an ink-receiver layer according to the invention, the total amount of the component (B) and the component (C) may be 5 to 200 parts by weight per 100 parts by weight of the component (A).

In the composition for forming an ink-receiver layer according to the invention, the ratio of the amounts of the component (B) and the component (C) (amount of component (B)/amount of component (C)) may be 1/10 to 10.

In the composition for forming an ink-receiver layer according to the invention, the component (A) may further contain a polymerization initiator in an amount of 0.01 to 10 parts by weight per 100 parts by weight of the component (A).

The composition for forming an ink-receiver layer according to the invention may be cured by exposure to radiation.

The method for producing a composition for forming an ink-receiver layer according to the invention comprises: preparing a monomer component containing a monofunctional monomer; forming a powder containing an egg white component; forming an eggshell powder; and mixing the monomer component, the egg-white-containing powder, and the eggshell powder, wherein formation of the egg-white-containing powder comprises drying a liquid egg white to produce the egg white component.

In the method for producing a composition for forming an ink-receiver layer according to the invention, production of the egg white component may comprise mixing a polyvalent metal salt to the liquid egg white.

In the method for producing a composition for forming an ink-receiver layer according to the invention, production of the egg white component may comprise adding a pH adjuster to make the pH of the liquid egg white 6 or less.

In the method for producing a composition for forming an ink-receiver layer according to the invention, production of the egg white component may comprise immersing dried powder obtained by drying the liquid egg white in a water-soluble organic solvent and removing the water-soluble organic solvent.

In the method for producing a composition for forming an ink-receiver layer according to the invention, production of the egg white component may comprise immersing dried powder obtained by drying the liquid egg white in a water-containing organic solvent formed of a water-soluble organic solvent and water, and removing the water-containing organic solvent, wherein the water-containing organic solvent contains 50 vol % or more of the water-containing organic solvent.

The printing base according to the invention comprises a supporting base and an ink-receiver layer formed thereon which is obtained using the composition for forming an ink-receiver layer according to the invention.

In the printing base according to the invention, the ink-receiver layer may be obtained by forming a coating film on the supporting base and curing the coating film by exposure to radiation.

The printing base according to the invention may be printed by an inkjet method.

In the printing base according to the invention, the supporting base may be an optical recording medium in which either writing or reading or both may be optically performed.

According to the composition for forming an ink-receiver layer of the invention, an ink-receiver layer which is excellent in quick-drying properties, image clarity, and image preserving properties such as water resistance may be formed on the printing side of the base on which printing is performed by an inkjet method. The egg white component used as the component (B) in the composition for forming an ink-receiver layer of the invention is a water-soluble protein that can absorb water. In addition, the egg white component can increase ink fixing property due to the possession of an amino group and a peptide bond in its molecule. The eggshell powder used as the component (C) also absorbs water due to its porous structure. In addition, the eggshell powder which contains organic compounds such as a protein can increase fixing property to or affinity with an acidic dye due to the presence of a functional group such as an amino group in the protein.

Tendency of affinity differs between the component (B) and the component (C) according to the type of acidic dye. For example, the component (B) is particularly excellent in fixation to a cyan or yellow dye, and the component (C) is particularly excellent in fixation to a magenta dye. Due to the presence of both the component (B) and the component (C), a composition for forming an ink-receiver layer excellent in image clarity can be obtained. Further, deterioration of an image with the passage of time (blotting caused by absorption of moisture in air, for example) can be suppressed by improved ink fixing property. Consequently, a composition which can provide an ink-receiver layer excelling in quick-drying properties, image clarity, and image preserving capability such as water resistance may be provided.

BEST MODE FOR CARRYING OUT INVENTION

One embodiment of the invention is described below.

1. Composition for Forming an Ink-receiver Layer

The composition for forming an ink-receiver layer according to the invention comprises (A) a monomer component containing a monofunctional monomer, (B) a powder containing an egg white component; and (C) eggshell powder. Each of these components is described below.

1.1. Monomer Component

The component (A) contains at least a monofunctional monomer. As examples of the monofunctional monomer, N-vinylpyrrolidone, N-acryloylmorpholine, N-vinylformamide, N,N-dimethylacrylamide, 2-hydroxyethyl(meth)acrylate, 2-hydroxypropyl(meth)acrylate, 2-hydroxy-3-phenoxypropyl(meth)acrylate, tetrahydrofurfuryl(meth)acrylate, butanediol monoacrylate, polyethylene glycol mono(meth)acrylate, polypropylene glycol mono(meth)acrylate, N,N-diethylaminoethylacrylate, N,N-dimethylaminoethyl(meth)acrylate, 2-hydroxyethyl vinyl ether, and methoxypolyethylene glycol mono(meth)acrylate can be given. Mixtures of these monomers may be used.

As monomers which are solid at room temperature, N-vinylacetamide and N-hydroxymethylacrylamide can be given. As monomers having a quarternary ammonium salt as a side chain, trimethyl-2-(acryloyloxy)ethylammonium chloride, trimethyl-3-(acryloyloxy)propylammonium chloride, trimethyl-2-hydroxy-3-(acryloyloxy)propylammonium chloride, trimethyl-2-(acryloylamino)ethylammonium chloride, and trimethyl-2-(acryloylamino)propylammonium chloride can be given. These solid monomers may be used after dissolving in the above liquid monomer.

The component (A) may further contain a polyfunctional monomer with two or more functions.

There are no specific limitations to the polyfunctional monomers. Examples include ethylene glycol di(meth)acrylate, diethylene glycol(meth)acrylate, polyethylene glycol di(meth)acrylate, pentaerythritol tri(meth)acrylate, pentaerythritol tetra(meth)acrylate, dipentaerythritol hexa(meth)acrylate, dipentaerythritol penta(meth)acrylate, trimethylolpropane tri(meth)acrylate, trimethylolpropane di(meth)acrylate, trimethylolpropane tri(meth)acrylate, neopentyl glycol di(meth)acrylate, 1,6-hexanediol di(meth)acrylate, bisphenol A, di(meth)acrylate, trihydroxyethyl di(meth)acryl isocyanurate, trihydroxyethyl tri(meth)acryl isocyanurate, ethylene oxide modified products or propylene oxide modified products of these compounds, (poly)ethylene glycol di(meth)acrylate, (poly)propylene glycol di(meth)acrylate, various urethane acrylates, epoxy acrylates, and polyester acrylates. Mixtures of these monomers may be used.

The polyfunctional monomers can provide cross-linking and can be used to control the hardness, water absorption, and water resistance of the coating film.

When a mixture of a monofunctional monomer and a polyfunctional monomer is used in combination as the monomer component (A), it is preferable that the monofunctional monomer be used in an amount of 70 to 99 wt % and the polyfunctional monomer with two or more functions be used in an amount of 1 to 30 wt %. It is more preferred that the monofunctional monomer be used in an amount of 80 to 98 wt % and the polyfunctional monomer be used in an amount of 2 to 20 wt %.

If the amount of the polyfunctional monomer is less than 1 wt %, curability of the composition and hardness of the coating film may be poor. In addition, it may be difficult to obtain sufficient water resistance. If the amount of the polyfunctional monomer exceeds 30 wt %, printability may be reduced due to low water absorption of the obtained cured film. Also, curving of the base due to shrinkage by curing or reduced fixation may be observed.

It is preferable that the component (A) be liquid to facilitate application to the supporting base. As examples of the component (A) in the liquid form, a liquid monomer or a solid monomer dissolved in a liquid monomer can be given. When heat curing is used as a curing method, a solid monomer dissolved in a known organic solvent may be used as a monomer component.

1.2. Egg-white-containing Powder

The component (B) is an egg-white-containing powder which contains an egg white component. In the invention, the term "egg white component" refers to a component obtained by drying liquid egg white to have a water content of 20% or less. As examples of the liquid egg white used as a raw material, liquid egg white obtained by cracking an egg to remove the yolk, thawing frozen egg white, hydrolyzing egg white after subjecting to an enzyme treatment, desalting egg white, removing a certain component in egg white such as lysozyme, chemically modifying egg white with a fatty acid and a saccharide, or desaccharizing egg white with an enzyme, a yeast, a bacteria, and the like can be given. A small amount of ingredients other than the egg white component, such as an egg yolk component, may be contained in the egg white component.

As the component (B), particles obtained by coating the surfaces of particles other than egg white particles with an egg white component, as well as dried egg white particles may be used. As the dried egg white particles, commercially available dried egg white particles may be used. Besides the commercially available dried egg white particles, dried egg white particles formed by drying liquid egg white which is subjected to various treatments may be used (refer to the section on the production method given later).

As the particles obtained by covering the surfaces of particles other than egg white particles with an egg white component, particles obtained by coating the surfaces of other organic or inorganic fillers with the egg white component can be used. Advantages of coating the surfaces of the other organic or inorganic filler with the egg white component are as follows. It is preferable that the average particle diameter of the component (B) be in a desired range (refer to explanation given below). In a common method of producing dried egg white particles, controlling the particle diameter with a high degree of accuracy may require a high cost and a long period of dime. If the surfaces of the other organic or inorganic fillers are covered with the egg white component, particles of which the average particle diameter is controlled more efficiently can be obtained. Fixing property of a dye can be ensured by the egg white component covering the surfaces of the organic or inorganic fillers.

As examples of the fillers of which the surfaces are coated with the egg white component, organic fillers such as cellulose and silk protein, and inorganic fillers such as titanium oxide, zinc oxide, silica, alumina, calcium carbonate, calcium sulfate, and synthetic mica can be given.

1.3. Eggshell Powder

The eggshell powder as the component (C) will now be explained.

The eggshell powder is obtained by pulverizing a bird's egg, in particular, a white chicken egg (white egg). Specifically, the eggshell powder is obtained by washing the eggshell such as a chicken eggshell with water, roughly pulverizing, removing an eggshell membrane, dehydrating, drying, and finely pulverizing. As a means for pulverizing the eggshell, a hammer mill, a ball mill, a jet mill, a turbo mill, a pin mill, and the like can be given.

As the eggshell powder, various commercially available eggshell powders or eggshell powders obtained by calcinating commercially available eggshell powder at a high temperature may be used. If the egg is not white, the shell is decolorized using a bleaching agent such as an oxidation-type chlorine-based bleaching agent, an oxidation-type oxygen-based bleaching agent, and a reduction-type bleaching agent.

It is preferable that the eggshell powder in the invention has a high degree of whiteness. The degree of whiteness here is a value determined by applying values measured by a Hunter colorimeter to the following formula (1).

$$W \text{ (degree of whiteness)} = 100 - [(100-L)^2 + (a^2+b^2)]^{1/2} \quad (1)$$

wherein L represents brightness, a represents hue, and b represents chroma.

It is preferable that the degree of whiteness measured by the calorimeter be 80° or higher. It is more preferable that the degree of whiteness be 90° or higher. The eggshell with a high degree of whiteness is preferred since a colored eggshell may cause the appearance of the ink-receiver layer to deteriorate, and adversely affect the color tone of a printed image.

The eggshell powder used as the component (C) of the invention has a specific surface area of 1.5 to 5.0 as measured by the BET multi-point surface area measurement. The reason is that the calcium carbonate as the main component of the eggshell powder is porous. The bulk specific gravity is in the range of 0.8 to 1.3 as measured by an ABD powder characteristic measuring instrument (manufactured by Tsutsui Rigaku Kikai Co., Ltd.).

The total amount of the component (B) and the component (C) is preferably 5 to 200 parts by weight per 100 parts by weight of the component (A), more preferably 20 parts to 100 parts by weight. If the amount is smaller than 5 parts by weight, the image clarity and water resistance tend to be insufficient. When the amount exceeds 200 parts by weight, drying properties tend to become poor. Further, coating properties may be impaired.

As for the ratio of the component (B) and the component (C), it is preferable that the content of the component (B)/the content of the component (C) be 1/10 to 10. If the ratio of the component (B) and the component (C) is outside the range of 1/10 to 10, synergistic effects obtained using both the component (B) and the component (C) cannot be obtained sufficiently.

The average particle diameters of the component (B) and the component (C) are preferably 0.01 to 30 microns. It is more preferable that the average particle diameters of the component (B) and the component (C) be 0.05 to 20 microns. If the average particle diameter is 0.01 microns, water absorption tends to be reduced, resulting in poor drying properties and image clarity. If the average particle diameter exceeds 30 microns, the smoothness of a coating film may be impaired, resulting in a poor appearance and image clarity.

The term "average diameter" used herein refers to a particle diameter obtained by irradiating particles with a laser beam and calculating a particle size distribution using an intensity distribution pattern of diffracted and diffused lights emitted from the irradiated the particles. As an example of a device for measuring the average particle size, a laser diffraction particle size distribution analyzer ("SALD2000A" manufactured by Shimadzu Corporation) can be given.

1.4 Others

The composition for forming the ink-receiver layer of the invention may contain a polymerization inhibitor, a leveling agent, a defoamer, a dispersant, a resin other than a monomer, and the like, if necessary. As the other inorganic fillers, fine particles of titanium oxide, zinc oxide, silica, alumina, calcium carbonate, calcium sulfate, synthetic mica, and the like, and as the organic fillers, particles of a cellulose resin such as methyl cellulose and hydrophilic fine particles such as particles of polyvinyl alcohol resins may be contained in an amount which will not impair the object of the invention.

The composition for forming the ink-receiver layer may contain a photoinitiator which generates a radical upon exposure to UV rays or visible rays when the UV rays or visible rays are used as radiation for curing. There are no specific limitations to the photoinitiators. A photoinitiator may be appropriately selected from known photoinitiators such as acetophenone-type, benzoin-type, benzophenone-type, and thioxanethone-type photoinitiators. Specific examples include 2-hydroxy-2-methyl propiophenone, 1-hydroxycyclohexyl phenyl ketone, benzoin, benzoin methyl ether, benzoin isopropyl ether, benzophenone, o-benzoil methyl benzoate, 2,4-diethylthioxanthone, 4,4-bisdiethylaminobenzophenone, 2,2-diethoxyacetophenone, 2-chlorothioxanthone, diisopropylthioxanthone, 9,10-anthraquinone, 2,2-dimethoxy-2-phenylacetophenone, 2-hydroxy-2-methylpropiophenone, 4-isopropyl-2-hydroxy-2-methyl propiophenone, alpha, alpha-dimethoxy-alpha-phenylacetone, and the like. Two or more compounds may be used in combination as the photoinitiator.

The photoinitiator may be used in an amount of 0.01 to 10 parts by weight, and preferably 0.5 to 8 parts by weight per 100 parts by weight of the component (A). If the amount of the photoinitiator is less than 0.01 part by weight per 100 parts by weight of the component (A), curing may be insufficient, the coating film may be sticky, and ink blotting may occur. If the amount exceeds 10 parts by weight, the coating film may be yellowish or otherwise colored.

As the source of UV rays to irradiate a coating film, a common source of light such as a metal halide lamp and a mercury lamp may be used.

According to the composition for forming an ink-receiver layer of the invention, an ink-receiver layer which is excellent in quick-drying property, image clarity, and image preserving capability such as water resistance may be formed on the printing side of the substrate on which printing is performed by the inkjet method. The egg white component as the component (B) of the composition for forming the ink-receiver layer of the invention can absorb water, because the egg white component is a water-soluble protein. The egg white component can also increase fixing property of the ink due to the possession of an amino group and a peptide bond in its molecule. The eggshell powder used as the component (C) can also absorb water due to its porosity. Since the component (C) contains organic compounds such as a protein, the eggshell powder can increase the bonding force to or affinity with an acidic dye due to the presence of a functional group such as an amino group contained in the protein.

Tendency of affinity may differ between the components (B) and (C) according to the type of the acidic dye. For example, the component (B) is particularly excellent in fixation to a cyan or yellow dye, and the component (C) is particularly excellent in fixation to a magenta dye. As a result, a composition for forming an ink-receiver layer excelling in image clarity can be obtained if the composition contains both the components (B) and (C). Further, deterioration of an image over time (blotting caused by absorbing moisture in air, for example) can be suppressed by improvement in ink fixing property. Thus, the composition for forming an ink-receiver layer excelling in quick-drying properties, image clarity, and image preserving capability such as water resistance can be provided according to the invention.

Pigments are negatively charged by surface treatment or by addition of a binder resin, and hence, have adsorptivity to the ink-receiver layer as in the case of dyes. Due to improved fixing property to the pigments, the ink-receiver layer can exhibit excellent quick-drying properties, image clarity, and water resistance.

2. Method for Producing a Composition for Forming an Ink-receiver Layer

A method of producing the composition for forming an ink-receiver layer according to the invention is described.

First, a monomer component is prepared. Since details of the monomer component are described above, further explanation is omitted here.

Next, powder containing an egg white component is formed. When an egg white component itself is used as the egg-white-containing powder, the egg-white-containing powder can be obtained by drying egg white liquid, and pulverizing the resulting dried egg white, if necessary. As the liquid egg white, liquid egg white obtained by cracking an egg to remove the yolk, thawing frozen egg white, hydrolyzing egg white after subjecting to an enzyme treatment, desalting egg white, removing a certain component in the egg white such as lysozyme, chemically modifying the egg white with a fatty acid or a saccharide, or desaccharizing the egg white with an enzyme, a yeast, a bacteria, or the like can be used. A small amount of components other than the egg white component, such as yolk, may be contained in the egg white component. Known methods are used to dry the liquid egg white. Examples include common technologies such as spray drying, freeze drying, and shallow pan drying.

It is preferable that the liquid egg white be egg white which has been subjected to at least one of a treatment (a) and treatment (b) described below. The treatment (a) is addition of a polyvalent metal salt to the liquid egg white. The treatment (b) is addition of a pH adjuster to adjust the pH of the liquid egg white to 6 or less. The details of each treatment are described below.

The treatment (a) is first described. As examples of the polyvalent metal salt used in the treatment (a), the following compounds can be given.

As examples of the polyvalent metal salt, a salt of a metal ion such as aluminum ion, barium ion, calcium ion, copper ion, iron ion, magnesium ion, manganese ion, nickel ion, tin ion, titanium ion, or zinc ion, and an acid such as hydrochloric acid, bromic acid, hydroiodic acid, sulfuric acid, nitric acid, phosphoric acid, thiocyanic acid, an organic carboxylic acid such as acetic acid, oxalic acid, lactic acid, fumaric acid, citric acid, salicylic acid, or benzoic acid, or an organic sulfonic acid can be given.

Specific examples include metal salts such as aluminum chloride, aluminum bromide, aluminum sulfate, aluminum nitrate, sodium aluminum sulfate, potassium aluminum sulfate, aluminum ammonium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Of these polyvalent metal salts, it is preferable to use a colorless and transparent metal salt to form a transparent ink-receiver layer. It is preferable that the polyvalent metal salt be mixed in an amount of 1 wt % to 10 wt % per 100 g of the egg white in the solid form.

When mixing these polyvalent metal salts with the liquid egg white, the polyvalent metal salt is added to the liquid egg white after dissolving the polyvalent metal salt in a small amount of water. The liquid egg white to which the polyvalent metal salt is added is stirred and dried by the drying method as described above to obtain egg-white-containing powder.

Advantages of performing the treatment (a) will be explained referring to the results of an experiment given below.

(Reference Experiment)

In the reference experiment, 1,000 g of liquid egg white was put into a poly beaker. The egg white was desaccharized by adding an enzyme. A solution obtained by dissolving 2 g of aluminum ammonium sulfate dodecahydrate as a polyvalent metal salt in 38 g of water was added to the liquid egg white. The resulting mixture was stirred for one hour and dried by a pan drying method to obtain a solid matter. The solid matter was pulverized to obtain an egg white component processed by the treatment (a). The FT-IR spectrum of the egg white component is indicated as a line 1 in FIG. 1. The FT-IR spectra of the egg white components obtained by increasing the amount of the aluminum ammonium sulfate dodecahydrate to 3 g and 5 g are shown as lines 2 and 3, respectively. As a comparative example, the FT-IR spectrum of an egg white component which was not processed by the treatment (a) is shown as a line 4.

Figure 1:
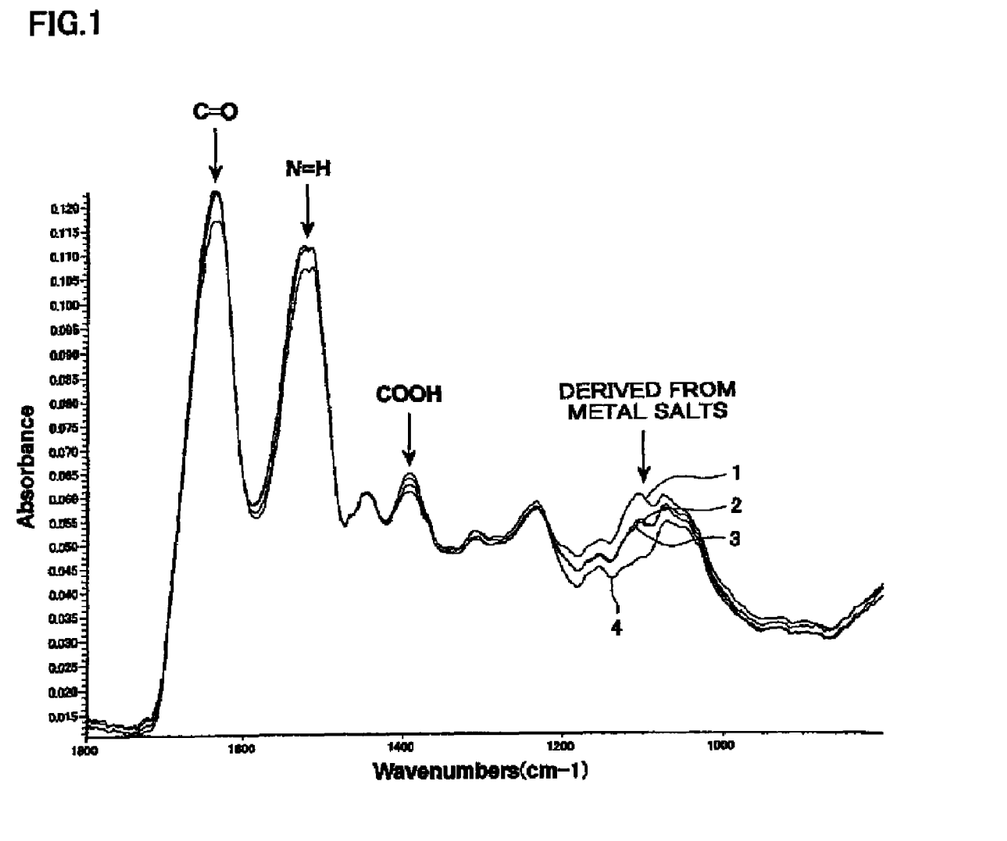
FIG. 1 is a graph showing the results of a reference experiment.

As shown in FIG. 1, as compared with the egg white component which was not subjected to the treatment (a), the spectrum intensities of a carboxyl group and an amide bond were decreased, and the spectrum intensity of a polyvalent metal salt was increased. From the results, it is believed that the metal ions generated by dissociation of the polyvalent metal salts in the solution are bonded to protein. It is thought that the presence of positively-charged metal ions in the egg white component facilitates fixation of the egg white components to dyes or like which are charged negatively.

The treatment (b) is described below. In the treatment (b), the pH value of the liquid egg white is adjusted to 6 or less by adding a pH adjuster. The liquid egg white is normally weakly alkaline (about 9 pH). Adjusting the pH from neutral to acid enables the liquid egg white to be charged positively as a whole. As a result, the liquid egg white easily bonds to a negatively-charged dye or the like, whereby fixing property to dyes or pigments can be improved.

It is preferable that a pH adjuster be added to adjust the pH of the liquid egg white to 4 or less. The liquid egg white contains various proteins. Each protein has an inherent isoelectric point. The lowest isoelectric point is at around 4 pH. Specifically, in the treatment (b), adjusting the pH of the liquid egg white to 4 or less enables the liquid egg white to be charged positively. Positively charging egg white is believed to increase the bonding force with a dye or a pigment and to contribute fixing property with a dye and the like. As the pH adjuster, hydrochloric acid may be added, for example.

The treatment (a) and the treatment (b) may be combined. In such an instance, either of the treatments may be carried out first.

To prepare an egg white component, powder obtained by drying liquid egg white is dipped in a water-soluble organic solvent, following which the water-soluble organic solvent is removed to collect the egg white component. As the water-soluble organic solvent, ethanol is preferable for ensuring the safety of working environment.

Besides the water-soluble organic solvent, a water-containing organic solvent in which a water-soluble organic solvent is mixed with water may be used. In such a case, the amount of the water-soluble organic solvent is 50 vol % or more, preferably 60 vol % or more, and more preferably 70 vol % or more and 95 vol % or less in the total amount of the water-containing organic solvent. If the amount of the water-soluble organic solvent is less than 50 vol %, the powder obtained by drying the liquid egg white is dissolved in water. As a result, it may be difficult to obtain powder in the form of particles after removing the solvent.

When particles obtained by covering the surfaces of particles other than egg white particles with an egg white component are used as the egg-white-containing powder, such an egg-white-containing powder can be obtained by mixing the above-mentioned other fillers with liquid egg white obtained by cracking an egg to remove the yolk, thawed frozen egg white, a solution obtained by re-dissolving dried egg white in water, or liquid egg white processed by the treatment (a) or the treatment (b), followed by drying.

Next, eggshell powder is formed. The formation of the eggshell powder was described above, and further explanation is omitted here.

Then, the monomer component, the egg-white-containing powder, and the eggshell powder are mixed. Specifically, if the liquid monomer component is used, the egg-white-containing powder and the eggshell powder are mixed in the liquid monomer component and stirred. When a solid monomer component is used, the solid monomer component is dissolved or dispersed in a liquid monomer component capable of dissolving or dispersing the solid monomer component. To the resulting solution or dispersion, an egg-white-containing powder and the eggshell powder are added and stirred, whereby a mixture of the monomer component, the egg-white-containing powder, and the eggshell powder is obtained.

There are no limitations to the order of preparing a monomer component, forming an egg-white-containing powder, and forming eggshell powder, insofar as all of the components are prepared prior to mixing.

According to the method of the invention, it is possible to produce a composition for forming an ink-receiver layer which is capable of forming an ink-receiver layer particularly excellent in ink fixing property and image preserving capability.

3. Printing Base

The printing base of the invention includes a supporting base and an ink-receiver layer formed thereon which is obtained by using the above-mentioned composition for forming an ink-receiver layer. The ink-receiver layer is a layer formed using the above-mentioned composition for forming an ink-receiver layer.

As examples of the supporting base, paper or plastic bases such as polyester resins, polycarbonate resins, acrylic resins, and cellulose resins can be given.

The ink-receiver layer may be formed by applying the composition for forming the ink-receiver layer to the supporting base by a known printing method such as screen printing, gravure printing, and flexo printing, or by a known coating method such as spin coating, dip coating, bar coating, and roll coating, and exposing the composition to radiation to cure. As the radiation used for curing, electron beams, UV rays, visible rays or the like may be used. The thickness of the ink-receiver layer thus obtained is preferably 5 to 100 microns, and more preferably about 10 to 30 microns.

The printing base of the invention has an ink-receiver layer suitable for inkjet printing. As described hereinabove, the ink-receiver layer is excellent in quick-drying properties, as well as image properties such as image clarity, and therefore can be suitably used for a variety of purposes. In particular, when the supporting base is an optical recording medium, an optical recording medium which satisfies the demand of common users who wishes to print characters expressing a recording content or high quality images like photograph for optimizing the design on the label side of a disk (side opposite to the side on which optical writing/reading is performed) can be provided. When the printing base is an optical recording medium, the optical recording medium has a coating-type recording layer containing a dye as the main component, a reflective layer, and a protective layer formed on a disk-like supporting base in that order. On top of the protective layer, an ink-receiver layer formed of a radiation-cured product of the coating composition of the invention is provided.

4. EXAMPLES

Examples of the invention are described below. The invention is not limited to the following examples. Modifications may be made within the scope of the invention.

As the component (A), the monomer components shown in the tables given later were prepared.

The method of forming the egg-white-containing powder (component (B)) will be described. In the examples, six egg-white-containing powders were prepared. As the first eggshell-containing powder, a powder obtained by pulverizing dried egg white using a jet mill ("K-type" manufactured by QP Corporation) was used. The average particle diameter of the resulting dried egg white particles was 7 microns. The average particle diameter was measured using a laser diffraction particle size distribution analyzer ("SALD 2000A" manufactured by Shimadzu Corporation; hereinafter the same).

As the second egg-white-containing powder, an egg-white-containing powder processed by a re-precipitation treatment using a water-soluble organic solvent was used. Specifically, 25 g of dried egg white was dissolved in 225 ml of water. The resulting solution was added dropwise to 1,000 ml of acetone. The precipitate produced was collected by filtration. The precipitate was dried at 40° C. The average particle diameter of the resulting egg-white-containing powder was 0.6 microns.

As the third egg-white-containing powder, an egg-white-containing powder obtained by drying a liquid egg white to which a pH adjuster was added (processed by the treatment (b)) was used. Specifically, 1 kg of liquid egg white was put into a beaker and 9 g of 33% citric acid and 2 g of yeast were added to desaccharize the egg white at 30° C. for 3 hours. Subsequently, 1N hydrochloric acid was added with stirring to adjust the liquid egg white to 4 pH. The resulting solution was dried by a pan dry method to obtain a solid. The third egg-white-containing powder was formed by pulverizing the solid. The average particle diameter of the resulting egg-white-containing powder was 7 microns.

As the forth egg-white-containing powder, an egg-white-containing powder obtained by drying liquid egg white to which the polyvalent metal salt was added (processed by the treatment (a)) was used. Specifically, 1 kg of liquid egg white was put into a beaker. 9 g of 33% citric acid, 2 g of yeast, and 5 g of aluminum ammonium sulfate dodecahydrate, as a polyvalent metal, were added and the mixture was stirred. The pH of the liquid egg white was 5.6. The resulting solution was dried by a pan drying method to obtain a solid. The forth egg-white-containing powder was obtained by pulverizing the solid. The average particle diameter of the resulting egg-white-containing powder was 6 microns.

As the fifth egg-white-containing powder, an egg-white-containing powder was formed by drying liquid egg white processed by the treatment (a) and the treatment (b). Specifically, 1 kg of liquid egg white was put into a beaker. 9 g of 33% citric acid, 2 g of yeast, 5 g of aluminum ammonium sulfate dodecahydrate, and 1N hydrochloric acid as a pH adjuster were added and the mixture was stirred. The pH of the liquid egg white was 4. The resulting solution was dried by a pan drying method to obtain a solid. The solid was pulverized to obtain the fifth egg-white-containing powder. The average particle diameter of the resulting egg-white-containing powder was 7 microns.

As the sixth egg white-containing powder, silica gel which is an inorganic filler coated with an egg white component was formed. Specifically, 25 g of dried egg white was dissolved in 225 ml of water. Subsequently, 25 g of "Sylysia 350" (manufactured by Fuji Silysia Chemical Ltd.) was added and the mixture was stirred. Water was removed by filtration. The collected filtrate was dried by heating at 40° C. to obtain "Sylysia 350" of which the surfaces were coated with the egg white component. The average particle diameter of the resulting egg-white-containing powder was 2.4 microns.

As the eggshell powder, a commercially available eggshell powder ("No. 11" manufactured by Q.P. Corporation) was used. The average particle diameter of the eggshell powder was 4 microns. The specific surface area and the degree of whiteness of the eggshell powder were 3.3 and 93.8, respectively. The specific surface area was measured by a high-accuracy full automatic gas adsorber "BELSORP 36" (manufactured by Bel Japan, Inc.), and the degree of whiteness was measured by a color difference meter "ZE2000" (manufactured by Nippon Denshoku Co., Ltd.).

Examples 1 to 8

The compositions for forming an ink-receiver layer of Examples 1 to 8 were obtained by mixing components of Table 1 at mixing ratios shown in the Table 1 using a stirrer. The compositions were applied to a 125 micron-thick bi-oriented polyester film by bar coating to form a coating layer. Immediately after the application, the coatings were cured by irradiation with UV rays using a metal halide lamp, thereby forming an ink-receiver layer. The thickness of the ink-receiver layer was 20 microns in Example 1, 22 microns in Example 2, 21 microns in Example 3, 21 microns in Example 4, 20 microns in Example 5, 22 microns in Example 6, 20 microns in Example 7, and 21 microns in Example 8.

Comparative Examples 1 to 5

In Comparative Examples 1 to 5, the compounds were mixed at the weight ratios shown in Table 1 below. The mixture was stirred using a stirrer, whereby compositions for forming an ink-receiver layer of Comparative Examples 1 to 5 were obtained.

Ink-receiver layers were formed in the same manner as in Example 1 using the compositions of Comparative Examples 1 to 5. The thickness of the resulting ink-receiver layer was 20 microns in Comparative Example 1, 21 microns in Comparative Example 2, 23 microns in Comparative Example 3, 21 microns in Comparative Example 4, and 21 microns in Comparative Example 5.

Evaluation 1

Printing was performed on the ink-receiver layers obtained in the examples and the comparative examples using an inkjet printer ("PM-G700" manufactured by Seiko Epson Corporation). The ink-drying properties, the image clarity, and the water resistance were evaluated according to the following methods of evaluation. The results are shown in Table 1.

Ink drying properties: A sheet of paper was pressed against the printing surface of the inkjet printer. The time spent until the time when more ink cannot be transferred to the paper was measure. The results were rated according to the following criteria
  Good: Drying time is within 30 seconds
  Fair: Drying time is from 30 seconds to 2 minutes
  Poor: Drying time is 2 minutes or longer The image clarity: The printing surface was observed visually and using an optical microscope (magnification: ×100) to evaluate the image clarity in accordance with the following criteria.
  Good: Image is clear with no blotting
  Fair: Slight blotting is observed
  Poor: Serious blotting or repelling of ink is observed Water resistance (resistance to image quality deterioration with passage of time): The printed sheets were stored at 60° C. and 90% for 24 hours to observe change of image visually and using an optical microscope (magnification ×100). The results were rated in accordance with the following criteria.
  Excellent: The image clarity is maintained unchanged after storing at a high temperature and high humidity.
  Good: The image clarity undergoes only a slight change after storing at a high temperature and high humidity.
  Pair: The color tone of the image changes with blotting being observed.
  Poor: Ink runs to cause significant blotting on the image.

TABLE 1

| | | | Example | | | | | | | | Comparative Example | | | | |
|---|---|---|---|---|---|---|---|---|---|---|---|---|---|---|---|
| | | | 1 | 2 | 3 | 4 | 5 | 6 | 7 | 8 | 1 | 2 | 3 | 4 | 5 |
| (A) | Monofunctional monomer | Acryloylmorpholine | 68 | 68 | 68 | 68 | 68 | 68 | 68 | 68 | 68 | 68 | 68 | 68 | 68 |
| | Polyfunctional monomer | Methoxy polyethylene glycol acrylate | 30 | 30 | 30 | 30 | 30 | 30 | 30 | 30 | 30 | 30 | 30 | 30 | 30 |
| | | Di(ethylene) glycol diacrylate | 2 | 2 | 2 | 2 | 2 | 2 | 2 | 2 | 2 | 2 | 2 | 2 | 2 |
| | Photoinitiator | Irgacure R149 | 5 | 5 | 5 | 5 | 5 | 5 | 5 | 5 | 5 | 5 | 5 | 5 | 5 |
| (B) | | $1^{st}$ egg-white-containing powder | 25 | 50 | 0 | 0 | 10 | 0 | 0 | 0 | 0 | 50 | 0 | 0 | 0 |
| | | $2^{nd}$ egg-white-containing powder | 0 | 0 | 10 | 0 | 0 | 0 | 0 | 0 | 0 | 0 | 0 | 0 | 0 |
| | | $3^{rd}$ egg-white-containing powder | 0 | 0 | 0 | 0 | 0 | 25 | 0 | 0 | 0 | 0 | 0 | 0 | 0 |
| | | $4^{th}$ egg-white-containing powder | 0 | 0 | 0 | 0 | 0 | 0 | 25 | 0 | 0 | 0 | 0 | 0 | 0 |
| | | $5^{th}$ egg-white-containing powder | 0 | 0 | 0 | 0 | 0 | 0 | 0 | 25 | 0 | 0 | 0 | 0 | 0 |
| | | $6^{th}$ egg-white-containing powder | 0 | 0 | 0 | 10 | 0 | 0 | 0 | 0 | 0 | 0 | 0 | 0 | 0 |
| (C) | | Eggshell powder | 25 | 10 | 25 | 25 | 50 | 25 | 25 | 25 | 0 | 0 | 50 | 0 | 0 |
| | Others | Sylysia 350 | 0 | 0 | 0 | 0 | 0 | 0 | 0 | 0 | 0 | 0 | 0 | 10 | 0 |
| | | Luminus | 0 | 0 | 0 | 0 | 0 | 0 | 0 | 0 | 0 | 0 | 0 | 0 | 50 |
| Evaluation | Drying properties | | Good | Good | Good | Good | Good | Good | Good | Good | Poor | Good | Good | Good | Fair |
| | Image clarity | | Good | Good | Good | Good | Good | Good | Good | Good | Fair | Good | Good | Fair | Good |
| | Water resistance | | Excellent | Excellent | Excellent | Excellent | Excellent | Excellent | Excellent | Excellent | Poor | Good | Good | Poor | Fair |

As is apparent from Table 1, the ink-receive layers formed in Examples 1 to 8 were excellent both in quick-drying property of ink and image clarity, as compared with Comparative Examples 1 to 5. The ink-receiver layers in Examples 1 to 8 were excellent in water resistance as compared with Comparative Example 2 (only the component (B) was used) and Comparative Example 3 (only the component (C) was used). From the above results, it was confirmed that the presence of both the component (B) and the component (C) can suppress deterioration of image quality with the passage of time.

Evaluation 2

Printing was performed on the ink-receiver layers obtained in the examples and the comparative examples using an inkjet printer ("PX-G900" manufactured by Seiko Epson Corporation). The quick-drying properties of ink, the image clarity, and the water resistance were evaluated according to the following evaluation method. The results are shown in Table 2. The evaluation of the quick-drying properties of ink, the image clarity, and the water resistance were evaluated in the same manner as in Example 1.

As is apparent from Table 2, the ink-receive layers formed in Examples 1 to 8 were excellent in quick-drying properties of ink and image clarity, as compared with Comparative Examples 1 to 5, even when pigments were used.

The invention claimed is:

1. A composition for forming an ink-receiver layer comprising (A) a monomer component containing a monofunctional monomer selected from the group consisting of N-vinylpyrrolidone, N-acryloylmorpholine, N-vinylformamide, N,N-dimethylacrylamide, 2-hydroxyethyl(meth)acrylate, 2-hydroxypropyl(meth)acrylate, 2-hydroxy-3-phenoxypropyl(meth)acrylate, tetrahydrofurfuryl(meth)acrylate, butanediol monoacrylate, polyethylene glycol mono(meth)acrylate, polypropylene glycol mono(meth)acrylate, N,N-diethylaminoethylacrylate, N,N-dimethylaminoethyl(meth)acrylate, 2-hydroxyethyl vinyl ether, methoxypolyethylene glycol mono(meth)acrylate, and mixtures thereof, (B) powder containing an egg white component; and (C) eggshell powder.

2. The composition for forming an ink-receiver layer according to claim 1, wherein the egg white component contains a polyvalent metal salt.

3. The composition for forming an ink-receiver layer according to claim 1, wherein the component (A) further comprises a bifunctional or greater functional monomer.

TABLE 2

| | | | Example | | | | | | | | Comparative Example | | | | |
|---|---|---|---|---|---|---|---|---|---|---|---|---|---|---|---|
| | | | 1 | 2 | 3 | 4 | 5 | 6 | 7 | 8 | 1 | 2 | 3 | 4 | 5 |
| (A) | Monofunctional monomer | Acryloylmorpholine | 68 | 68 | 68 | 68 | 68 | 68 | 68 | 68 | 68 | 68 | 68 | 68 | 68 |
| | Polyfunctional monomer | Methoxy polyethylene glycol acrylate | 30 | 30 | 30 | 30 | 30 | 30 | 30 | 30 | 30 | 30 | 30 | 30 | 30 |
| | | Di(ethylene) glycol diacrylate | 2 | 2 | 2 | 2 | 2 | 2 | 2 | 2 | 2 | 2 | 2 | 2 | 2 |
| | Photo-initiator | Irgacure R149 | 5 | 5 | 5 | 5 | 5 | 5 | 5 | 5 | 5 | 5 | 5 | 5 | 5 |
| (B) | | 1st egg-white-containing powder | 25 | 50 | 0 | 0 | 10 | 0 | 0 | 0 | 0 | 50 | 0 | 0 | 0 |
| | | 2nd egg-white-containing powder | 0 | 0 | 10 | 0 | 0 | 0 | 0 | 0 | 0 | 0 | 0 | 0 | 0 |
| | | 3rd egg-white-containing powder | 0 | 0 | 0 | 0 | 0 | 25 | 0 | 0 | 0 | 0 | 0 | 0 | 0 |
| | | 4th egg-white-containing powder | 0 | 0 | 0 | 0 | 0 | 0 | 25 | 0 | 0 | 0 | 0 | 0 | 0 |
| | | 5th egg-white-containing powder | 0 | 0 | 0 | 0 | 0 | 0 | 0 | 25 | 0 | 0 | 0 | 0 | 0 |
| | | 6th egg-white-containing powder | 0 | 0 | 0 | 10 | 0 | 0 | 0 | 0 | 0 | 0 | 0 | 0 | 0 |
| (C) | | Eggshell powder | 25 | 10 | 25 | 25 | 50 | 25 | 25 | 25 | 0 | 0 | 50 | 0 | 0 |
| | Others | Sylysia 350 | 0 | 0 | 0 | 0 | 0 | 0 | 0 | 0 | 0 | 0 | 0 | 10 | 0 |
| | | Luminus | 0 | 0 | 0 | 0 | 0 | 0 | 0 | 0 | 0 | 0 | 0 | 0 | 50 |
| Evaluation | Drying properties | | Excellent | Excellent | Excellent | Excellent | Excellent | Excellent | Excellent | Excellent | Poor | Good | Good | Good | Fair |
| | Image clarity | | Excellent | Excellent | Excellent | Excellent | Excellent | Excellent | Excellent | Excellent | Fair | Good | Good | Fair | Good |
| | Water resistance | | Excellent | Excellent | Excellent | Excellent | Excellent | Excellent | Excellent | Excellent | Poor | Good | Good | Poor | Fair |

4. The composition for forming an ink-receiver layer according to claim 1, wherein the component (B) is dried egg white particles.

5. The composition for forming an ink-receiver layer according to claim 1, wherein the component (B) is inorganic or organic particles of which the surfaces are covered with the egg white component.

6. The composition for forming an ink-receiver layer according to claim 1, wherein the component (B) has an average particle diameter of 0.01 to 30 microns.

7. The composition for forming an ink-receiver layer according to claim 1, wherein the component (C) has an average particle diameter of 0.01 to 30 microns.

8. The composition for forming an ink-receiver layer according to claim 1, wherein the total amount of the component (B) and the component (C) is 5 to 200 parts by weight per 100 parts by weight of the component (A).

9. The composition for forming an ink-receiver layer according to claim 1, wherein the ratio of the amounts of the component (B) and the component (C) (amount of component (B)/amount of component (C)) is 1/10 to 10.

10. The composition for forming an ink-receiver layer according to claim 1, wherein the component (A) further comprises a polymerization initiator in an amount of 0.01 to 10 parts by weight per 100 parts by weight of the component (A).

11. The composition for forming an ink-receiver layer according to claim 1, which is cured by exposure to radiation.

12. A method for producing a composition for forming an ink-receiver layer comprising: preparing a monomer component containing a monofunctional monomer selected from the group consisting of N-vinylpyrrolidone, N-acryloylmorpholine, N- vinylformamide, N,N-dimethylacrylamide, 2-hydroxyethyl(meth)acrylate, 2-hydroxypropyl(meth)acrylate, 2-hydroxy-3-phenoxypropyl(meth)acrylate, tetrahydrofurfuryl(meth)acrylate, butanediol monoacrylate, polyethylene glycol mono(meth)acrylate, polypropylene glycol mono(meth)acrylate, N,N-diethylaminoethylacrylate, N,N-dimethylaminoethyl(meth)acrylate, 2-hydroxyethyl vinyl ether, methoxypolyethylene glycol mono(meth)acrylate, and mixtures thereof, forming a powder containing an egg white component, forming an eggshell powder, and mixing the monomer component, the egg-white-containing powder, and the eggshell powder, wherein formation of the egg-white-containing powder comprises drying a liquid egg white to produce the egg white component.

13. The method for producing a composition for forming an ink-receiver layer according to claim 12, wherein production of the egg white component comprises mixing a polyvalent metal salt with the liquid egg white.

14. The method for producing a composition for forming an ink-receiver layer according to claim 12, wherein production of the egg white component comprises adding a pH adjuster to make the pH of the liquid egg white 6 or less.

15. The method for producing a composition for forming an ink-receiver layer according to claim 12, wherein production of the egg white component comprises immersing dried powder obtained by drying the liquid egg white in a water-soluble organic solvent and removing the water-soluble organic solvent.

16. The method for producing a composition for forming an ink-receiver layer according to claim 12, wherein production of the egg white component comprises immersing dried powder obtained by drying the liquid egg white in a water-containing organic solvent formed of a water-soluble organic solvent and water, and removing the water-containing organic solvent, wherein the water-containing organic solvent contains 50 vol % or more of the water-soluble organic solvent.

17. A printing base comprising a supporting base and an ink-receiver layer formed thereon which is obtained by using the composition for forming an ink-receiver layer according to claim 1.

18. The printing base according to claim 17, wherein the ink-receiver layer is obtained by forming a coating film on the supporting base and curing the coating film by exposure to radiation.

19. The printing base according to claim 17, which is printed by an inkjet method.

20. The printing base according to claim 17, wherein the supporting base is an optical recording medium in which either writing or reading or both are optically performed.

* * * * *